INVENTOR
B. BLAKELY, JR.
BY Harry C. Hart
ATTORNEY

March 8, 1960 B. BLAKELY, JR 2,927,968

LINE SWITCHING SYSTEMS

Filed April 22, 1958 4 Sheets-Sheet 2

INVENTOR
B. BLAKELY, JR.
BY Harry C. Hart
ATTORNEY

March 8, 1960 B. BLAKELY, JR 2,927,968

LINE SWITCHING SYSTEMS

Filed April 22, 1958 4 Sheets-Sheet 3

INVENTOR
B. BLAKELY, JR.
BY Harry C. Hart
ATTORNEY

March 8, 1960 B. BLAKELY, JR 2,927,968

LINE SWITCHING SYSTEMS

Filed April 22, 1958 4 Sheets-Sheet 4

INVENTOR
B. BLAKELY, JR.
BY Harry C. Hart
ATTORNEY 2,927,968

LINE SWITCHING SYSTEMS

Bryce Blakely, Jr., Murray Hill, N.J., assignor to Bell Telephone Laboratories, Incorporated, New York, N.Y., a corporation of New York Application April 22, 1958, Serial No. 730,088

7 Claims. (Cl. 179—15)

Figure 1:
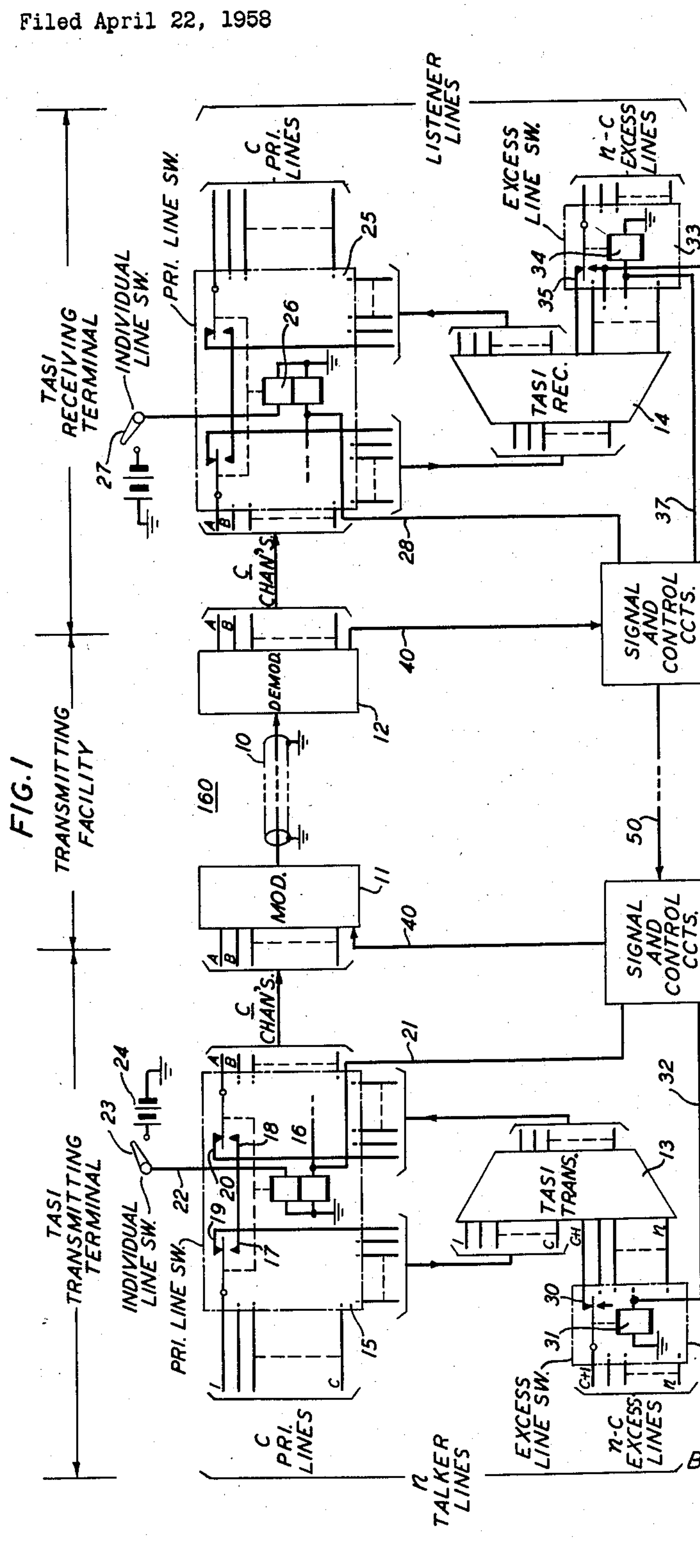

This invention relates to multi-channel communication systems and, more particularly, to line switching circuits for use with such systems.

In communication systems employing long and expensive transmission facilities, such as trans-oceanic submarine cable facilities, it is economical to utilized terminal facilities which insure full use of all of the available channel time. One system proposed for saving channel time is based on the statistical fact that conversations use the facilities, on the average, for less than one-third of the time. Therefore, by interconnecting the two parties only when the line is active, large savings in channel time may be effected. The terminal facilities which perform this function have been termed "time assignment speech interpolation" systems or, more conveniently, TASI systems. One such system is disclosed in the copending application of F. A. Saal and I. Welber, Serial No. 686,468, filed September 26, 1957.

By utilizing TASI facilities at the terminals of the transmission system, the capacity, in total number of conversations carried, of the system can be doubled or even tripled by assigning the transmission channels of the system to the talkers being served only while they are actually active, i.e., speaking. In order to secure the benefits of speech interpolation, however, a rather complex switching arrangement is required at each end of the transmission system to perform the necessary connections and disconnections. These switching arrangements include, in addition to individual talker-to-channel switches, a large amount of common control equipment to supervise and monitor the operation of the switches. Any failure, however small, in this common control equipment could result in the failure of the entire time assignment speech interpolation facilities and thus terminate the use of the transmission system entirely. It should be observed, however, that in such an event, the transmission medium might itself be completely operational.

It is an object of the present invention to insure the utilization of transmission systems incorporating time assignment speech interpolation facilities to their fullest capacity.

It is another object of the present invention to switch time assignment speech interpolation facilities into and out of service in a communications system.

It is a more specific object of the invention to maintain substantially continuous service to selected customers using a communication system incorporating time assignment speech interpolation facilities upon failure of those facilities.

It is yet another object of the invention to switch time assignment speech interpolation facilities at each end of a long transmission system substantially simultaneously.

In accordance with the present invention, the above objects are achieved in a communication system by removing TASI facilities from service and simultaneously connecting the channels of the transmission system to an equal number of the customer lines previously being served by the TASI facilities. By the use of automatically responsive devices and by means of coded signals transmitted between terminals, the switching of the TASI facilities can be made sufficiently smooth to provide substantially uninterrupted service to the customers switched directly to the transmission channels.

More specifically, a TASI terminal at one end of the transmission system in which a failure occurs initiates a switching signal which is transmitted, via the transmission system, to the remote terminal at the other end. The remote terminal then returns a verification signal to the initiating terminal to cause actual switching. The remote terminal itself is made to wait a period of time equal to the propagation time of the transmission system before switching. The two terminals therefore switch simultaneously and provide continuous through service.

A feature of the present invention resides in the use of the same equipment for emergency switching as is used for removing and replacing the TASI facilities for routine purposes such as periodic maintenance tests and in times of low traffic volume.

Another feature of the present invention resides in the use of the same switching facilities to remove individual transmission channels from the TASI facilities and thus allow their use for full-time transmission, for example, for program service.

These and other objects and features, the nature of the present invention and its various advantages, will be more fully understood upon consideration of the accompanying drawings and of the following detailed description of the drawings.

Figure 6:
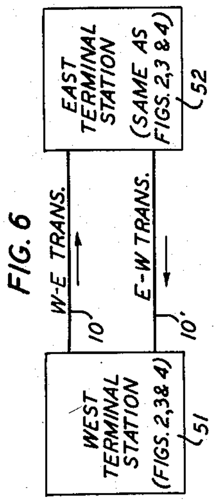
Figure 5:
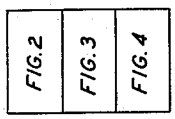
Figure 2:
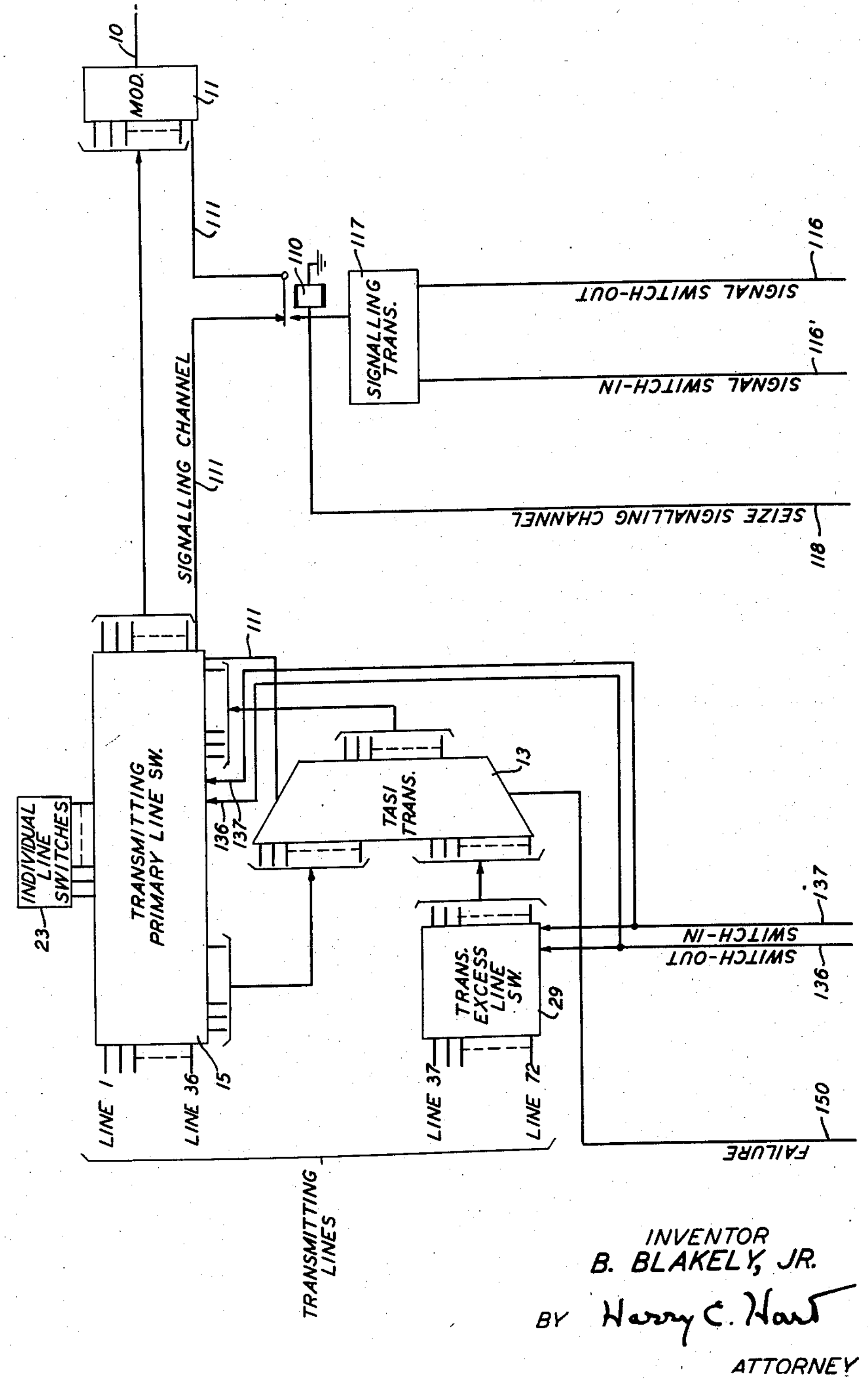
Figure 3:
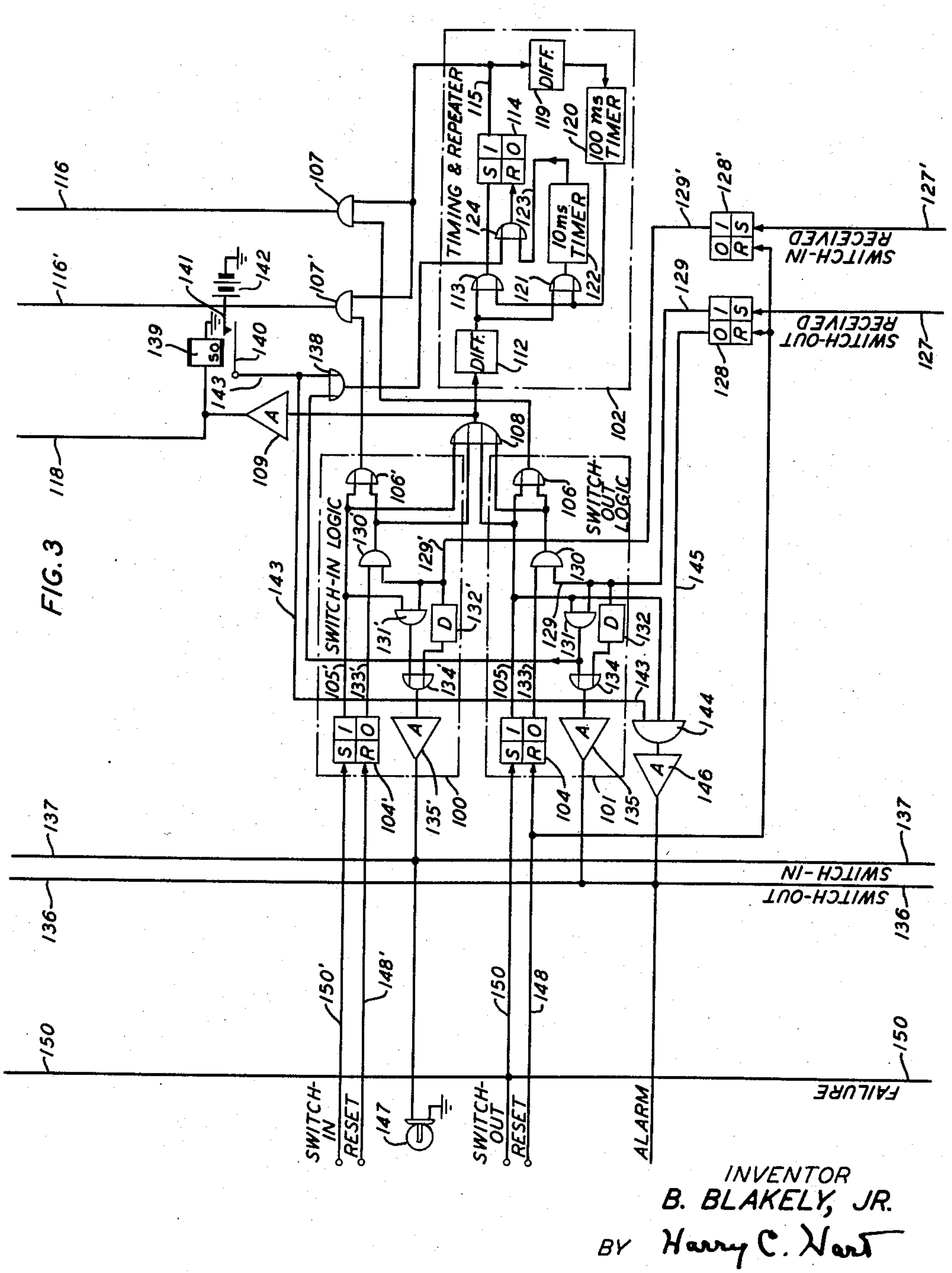
Figure 4:
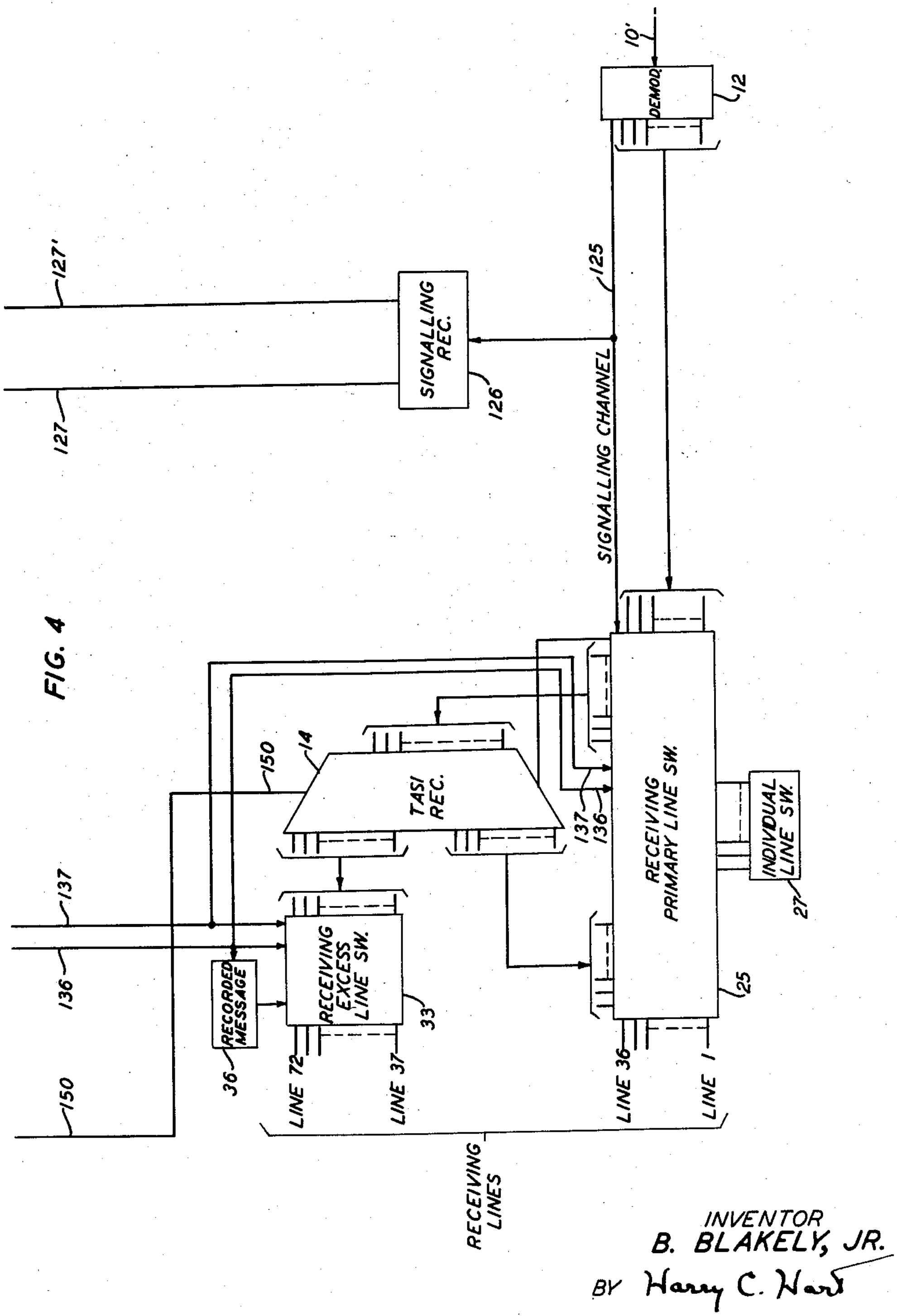

In the drawings:

Fig. 1 is a simplified functional block diagram of a communication system illustrating the switching arrangements of the present invention;

Figs. 2 through 4, when arranged in the manner shown in Fig. 5, comprise a detailed block diagram of one terminal station of a time assignment speech interpolation switching system embodying the principles of the present invention; and Fig. 6 is a block diagram of a complete system employing two terminal stations such as those illustrated in Figs. 2 through 4 connected by two separate one-way transmission media.

Referring more particularly to Fig. 1, there is shown a functional block diagram of a line switching arrangement which can be used in conjunction with time assignment speech interpolation facilities in a communication system. An essential part of the communication system illustrated is a transmission medium 10 which may be a carrier transmission line or any other multi-channel transmission facility. Transmission medium 10 is illustrated in Fig. 1 as a coaxial cable which is capable, by means of frequency multiplexing techniques, of carrying a fixed number *c* of individual communication channels. Thus, a modulator 11 converts signal waves on its *c* input terminals to a single frequency multiplexed signal on its output terminal. Similarly, a demodulator 12 reconverts the frequency multiplexed signal on transmission medium 10 to individual signal waves on *c* output terminals.

In order to more fully utilize the capacity of the transmission channels provided by transmission facility 160 comprising modulator 11, transmission medium 10 and demodulator 12, time assignment speech interpolation (TASI) transmitter 13 assigns *n* talker lines to these *c* transmission channels only while the individual talker lines are active, that is, are actually carrying speech signal waves. Since *n* may be much greater than *c*, a significant increase in transmission efficiency is achieved, as measured by the number of individual talkers accommodated by the same *c* transmission channels. A TASI receiver 14 at the remote end of the transmission facility 160 assigns the other ends of the *c* transmission channels to the appropriate ones of *n* listener lines to complete a connection from an individual talker to the proper individual listener. Time assignment speech interpolation facilities for performing these functions are disclosed in detail in the aforementioned copending application of F. A. Saal and I. Welber.

In accordance with the present invention, means are provided to bypass the time assignment speech interpolation facilities and connect *c* of the talker lines and listener lines directly to the *c* transmission channels afforded by transmission facility 160. Primary line switch 15 is provided to perform this function. The switching arrangements for only one of the *c* lines is illustrated since the facilities for the remainder of the *c* lines are merely duplications of the one illustrated.

Thus, *c* of the *n* talker lines are, for convenience, termed primary lines and are introduced into primary line switch 15. A relay 16 is provided to connect talker line 1 directly to transmission channel A or, alternatively, through TASI transmitter 13 to any one of the *c* transmission channels. Thus, contacts 17 and 18 will connect primary line 1 directly to transmission channel A. Contacts 19 and 20, on the other hand, connect primary line 1 to the input of TASI transmitter 13 and connect transmission channel A to the output of TASI transmitter 13. A simple and efficient means is thus provided for inserting or removing the TASI transmitter 13 from service.

Relay 16 has two windings, one of which is energized by a voltage on lead 21 and the other of which is energized by voltage on lead 22. Lead 21 is connected not only to relay 16 but also to all of the relays for the remainder of the *c* primary lines. Lead 22, on the other hand, is connected to a switch 23 which serves to connect a battery 24 to this lead and thus to energize it on an individual basis. An individual line switch similar to switch 23 is provided for each of the relays asociated with the *c* primary lines. A voltage on lead 21 serves to connect all of the *c* primary lines directly to the transmission channels while a voltage on lead 22 serves to connect only primary line 1 directly to transmission line A.

At the receiving terminal, primary line switch 25 is provided with a relay 26, an individual line switch 27 and a common control lead 28 which perform corresponding functions at the receiving terminal. It should be noted that, although the line switches are illustrated as electromechanical switches, any equivalent electronic switching circuit would be equally suitable, particularly where rapid switching is desired. An electronic switch suitable for this purpose is disclosed in the copending application of J. D. Johannesen, P. B. Myers and J. E. Schwenker, Serial No. 570,530 filed March 9, 1956.

Returning to the transmission terminal, it can be seen that of the *n* talker lines being served by the TASI facilities, *n*—*c* lines remain as inputs to TASI transmitter 13. An excess line switch 29 is provided to disconnect these *n*—*c* excess lines from the input of TASI transmitter 13. Excess line switch 29 comprises a plurality of relays such as relay 31 to perform this operation for each of the excess lines. Similar relays, not illustrated, are provided, one for each of the remainder of the excess lines. All of the excess line relays can be energized by a voltage on a single common control lead 32.

At the receiving terminal, a similar excess line switch 33 is provided having a relay 34 and a contact 35 to connect the corresponding excess line directly to TASI receiver 14 or, in the alternative, through contact 44 to a recorded message source 36. As in the transmission terminal, each of the excess lines is provided with a similar relay and set of contacts. All of these relays are operated by a voltage on a common control lead 37.

The primary and excess line switches at the transmission terminal are controlled by a signal and control circuit 38 while the primary and excess line switches at the receiving terminal are controlled by a signal and control circuit 39. The function of these signal and control circuits 38 and 39 will be more fully described hereinafter, but it can be stated here that the switching operations at the transmission and receiving terminals are caused to take place substantially simultaneously and automatically in response to a failure of the TASI facilities by means of control signals transmitted over signaling channels 40 and 50.

It can be seen that the switching system of the present invention serves to preserve the basic capacity of transmission facility 160 by insuring the use of these facilities after a failure in the TASI facilities 13 or 14. This is accomplished by maintaining a connection between at least *c* of the *n* talker lines and the corresponding *c* listener lines during such a failure.

At the receiving terminal, the excess lines are connected to a recorded message source 36 at the time the TASI facilities are removed from service. The function of recorded message source 36 is to apprise the listeners connected to the excess lines that they are no longer being served and to instruct them how to proceed to secure a new connection.

It should be noted that the switching system of Fig. 1 illustrates facilities for transmitting in one direction only. Similar facilities extending in the reverse direction of transmission must be provided to produce a complete communications system.

In Figs. 2 through 4, when arranged as shown in Fig. 5, there is shown a detailed block diagram of one terminal station of a line switching system in accordance with the present invention. In Figs. 2 through 4, components which are the same as the components of Fig. 1 are identified by the same reference numerals. Thus in Fig. 2 the transmitting input lines to a time assignment speech interpolation transmitter 13 are divided into primary lines and excess lines. The primary lines are connected by way of primary line switch 15 to the input of the TASI transmitter 13 and then to the input of modulator 11 or, alternatively, directly to the input of modulator 11. The excess lines are connected by way of excess line switch 29 to the input to TASI transmitter 13.

Similarly, in Fig. 4, primary line switch 25 connects the outputs of demodulator 12 to the input of TASI receiver 14 and then to the receiving lines or, alternatively, directly to the receiving lines. Excess line switch 33 likewise connects the balance of the receiving lines to the output of TASI receiver 14.

It will be noted that Figs. 2 through 4 illustrate only one terminal station of a complete communication system utilizing the switching arrangements of the present invention. Thus the receiving equipment illustrated in Fig. 4 is actually at the same end of transmission facility 160 as is the transmitting equipment illustrated in Fig. 2. It is to be understood, however, that the invention contemplates a duplication of the entire terminal station illustrated in Figs. 2 through 4 at the remote end of transmission facility 160 to form a fully symmetrical switching system. Such an arrangement has been illustrated in block form in Fig. 6. For convenience, however, only one terminal station has been illustrated in detail. This presentation has been found to be desirable due to the fact that the present invention contemplates a complete round trip of control signals and hence requires local receiving as well as transmission facilities. When describing the operation of the switching system, functions to be carried on at the remote terminal station will be described with reference to the local terminal station with which it is identical.

Proceeding now to a detailed description of the functional block diagram of Figs. 2 through 4, it will be seen that Figs. 2 and 4 correspond roughly to the switching portions of the simplified block diagram of Fig. 1. Fig. 3, on the other hand, corresponds to the signal and control circuit 38 or 39 in Fig. 1. The description of the detailed block diagram will be begun with Fig. 3.

If, as is proposed by the present invention, it is desired to switch a plurality of communication links while they are transmitting information and without any perceptible interruption in that transmission, it is necessary to meet certain standards in switching. In the transmission of voice signals, i.e., telephone conversations, for example, an interruption in a conversation for more than 150 milliseconds might be interpreted by the human ear as an interruption in service. Interruptions of lesser duration are imperceptible or are interpreted as "hits," i.e., interference. It is therefore desirable that a switching system which substitutes direct connections for connections through TASI equipment will complete the direct connections within 150 milliseconds of the actual failure.

Even more important, however, particularly in the case of partial failures of the TASI equipment, is that the local and the remote switching operations be substantially simultaneous, i.e., within a few milliseconds of each other. This is true because any customer who continues to receive service through partially impaired TASI equipment is much more sensitive to two separate switching operations (interruptions) than he is to a single one. The switching system of the present invention is fully capable of meeting both of these standards, even on exceptionally long transmission facilities such as trans-oceanic submarine cables.

In general, the system of the present invention operates to fill the above and other requirements by means of coded switching signals transmitted back and forth between the local and the remote terminal stations. Upon occurrence of a failure, the terminal station in which the failure occurs initiates a multifrequency coded switch-out signal which is transmitted to the remote terminal station. Upon receipt of this switch-out signal, the remote terminal station transmits back a verification signal indicating that the switch-out signal has been received and that switch-out can now be made. The remote terminal station then waits for a period of time equal to the propagation time of the transmission facility before switching. The local terminal station switches as soon as it receives the verification signal. In this way both terminals switch simultaneously. Switch-in (replacing the TASI facilities in service) is carried on in a similar manner.

Should the switch-out signal be lost or obscured by noise, means are also provided to repeat the switch-out signal at fixed intervals. Furthermore, if no verification is received after a reasonable number of trys, an alarm signal is generated to warn attendant personnel of the situation.

Proceeding to a detailed description of Fig. 3 of the drawings, there are shown three major logic units comprising switch-in logic circuit 100, switch-out logic circuit 101 and common timer and repeater circuit 102. These three logic circuits consist, in part, of AND and OR gates which have been schematically represented in a conventional notation.

The AND gates have thus been represented by semicircular figures each having a plurality of input lines drawn exactly to the straight line portion of the figure and a single output line drawn to the curved portion of the figure. According to the convention, the output line will be activated only when a given signaling condition exists simultaneously on all of the input lines.

Conversely, the OR gates are represented by semicircular figures having a plurality of input lines drawn through the straight line portion of the figure to the curved portion. As before, a single output line is drawn from the curved portion of the figure. According to the convention, the output line will be activated when a given signaling condition exists on any one or more of the input lines.

It will be noted that switch-in logic circuit 100 and switch-out logic circuit 101 are substantially identical in their components. This is true because substantially the same procedure is used for switch-in as is used for switch-out. The switch-out logic circuit 101 will be described in detail and identical reference numerals with a prime will be used to designate the corresponding components of the switch-in logic circuit 100.

Upon the occurrence of a complete or partial failure in the TASI control equipment, a signal condition such as a pulse is introduced on lead 150. This signaling condition is, in the preferred arrangement, generated automatically upon such a failure by any means known to the art. It may also, however, be generated manually by the operation of a switch. The means for generating such a signal has not been illustrated since it forms no part of the present invention and can take any one of many forms.

The signaling condition on lead 150 serves to set a bistable device 104, for example a bistable multi-vibrator circuit, and thus produce an output on lead 105. The output on lead 105 enables OR gate 106, the output of which is used to partially enable AND gate 107. Simultaneously, the output on lead 105 is also used to enable the four-input OR gate 108. The output of OR gate 108 is simultaneously introduced into timing and repeater circuit 102 and amplifier 109. The output of amplifier 109 on lead 118 is used to operate relay 110 in Fig. 2 and seize signaling channel 111 from the TASI equipment for use in transmitting switch-out signals.

In timing and repeater circuit 102, the output of OR gate 108 is shaped to produce a sharp pulse by differentiating circuit 112 and utilized to enable OR gate 113. The output of OR gate 113 serves to set bistable device 114 and produce an output on lead 115. The output on lead 115 is utilized to complete the enablement of AND gate 107 and thus produce a signal on output lead 116. This signal on lead 116 is introduced into a signaling transmitter 117 which then generates the particular signaling code which indicates that a switch-out operation has been initiated. This coded signal, hereinafter termed the switch-out signal, is transmitted via signaling channel 111, previously seized by relay 110, to the remote TASI terminal.

The particular form of switch-out signal used is not critical. However, a multifrequency tone signal coded in a somewhat complex code pattern, such as a four-out-of-fifteen code, is particularly suitable. The more complex the coded switch-out signal, the less apt the receiving equipment is to operate erroneously in response to noise or other signals.

Returning to timing and repeater circuit 102, the output of differentiating circuit 112 is also used to enable OR gate 121, the output of which is applied to a timing circuit 122. Timing circuit 122 produces an output on lead 123 a fixed time interval, for example ten milliseconds, after being triggered by the output of OR gate 121. Timing circuits of this type are well known in the art and may comprise, for example, a monostable multivibrator with a fixed recovery time. The output of timing circuit 122 on lead 123 enables OR gate 124, the output of which resets bistable device 114 and removes the output from lead 115.

It can be seen that timing circuit 122 determines the duration of the switch-out signal. This switch-out signal continues for the period during which an output appears on lead 115. This output is initiated when bistable device 114 is set by the output of OR gate 113 and is terminated ten milliseconds later when bistable device 114 is reset by the output of OR gate 124. The duration of ten milliseconds was chosen because tone-coded signals require approximately this duration to be easily recognizable by receiving equipment of economical design.

The output of bistable device 114, which appears on lead 115, is also shaped in differentiating circuit 119 and applied to a timing circuit 120. Timing circuit 120 is similar to timing circuit 122 except that its timing period is significantly greater than that of timing circuit 122, for example, 100 milliseconds. Therefore, after a period of 100 milliseconds, timing circuit 120 produces an output which first sets bistable device 114 through OR gate 113 and then, after a delay of ten milliseconds, resets bistable device 114 through OR gate 121, timing circuit 122 and OR gate 124.

It can be seen that timing circuit 120 provides for a repetition of the switch-out signals at intervals of 100 milliseconds and would, if not inhibited as later described, continue to do so indefinitely. Provision for repetition of the switch-out signal is made in order to insure that the remote terminal receives the switch-out signal even after one of the signals is lost by noise distortion or service interruption.

In order to complete the description of the switch-out operation, it is necessary to show what the remote terminal does with the switch-out signal. Since both terminals are identical, this will be described with reference to the local terminal illustrated in Figs. 2 through 4. It should be remembered, however, that the following operations actually take place at the remote terminal.

Proceeding to Fig. 4 of the drawings, the receiving terminal of a TASI switching system is there shown which includes, in part, a signaling channel 125, corresponding to the signaling channel 111 at the transmitting terminal. Signaling channel 125 is connected to signaling receiver 126 which is adapted to receive and recognize the signals generated in the remote signaling transmitter similar to signaling transmitter 117 of Fig. 2.

Upon receipt of the switch-out signal appearing on signaling channel 125, signaling receiver 126 produces an output on lead 127, indicating that such a switch-out signal has been received. The signal on lead 127 serves to set bistable device 128 and produce an output on lead 129. The output on lead 129 is introduced simultaneously into AND gate 130, AND gate 131 and delay circuit 132. If the circuitry of Fig. 3 is now taken as the remote terminal switching control circuitry, bistable device 104 is not set and no output appears on lead 105. On the contrary, an output appears on lead 133 which, together with the signal on lead 129, completely enables AND gate 130 to produce an output which enables OR gate 106. In this way the transmission of a switch-out signal is initiated at the remote terminal. This switch-out signal now represents, however, a verification that the switch-out signal has been received. The output of OR gate 106 is introduced into AND gate 107 as before while the output of AND gate 130 is introduced into OR gate 108 and thence to the amplifier 109 and timing and repeater circuit 102. The operation in this respect is identical to that described above when the control circuitry of Fig. 3 was assumed to be the local terminal.

The output of bistable device 128 is also introduced into delay circuit 132. Delay circuit 132 delays this signal by an interval of time which is substantially equal to the propagation time of the transmission system between the local and remote TASI terminals. After such a delay, this signal is applied to enable OR gate 134 and produce an output which is applied to amplifier 135. The output of amplifier 135 is, in turn, applied to switch-out bus 136.

The signal appearing on switch-out bus 136 is utilized to perform the primary and excess line switching operations at the transmitting terminal, described in detail with reference to Fig. 1. Thus in Fig. 2, switch-out bus 136 is connected to transmitting primary line switch 15 and simultaneously to transmitting excess line switch 29. At transmitting primary line switch 15 it operates to disconnect the primary lines from TASI transmitter 13 and connect them directly to modulator 11. At transmitting excess line switch 29, however, the signal on switch-out bus 136 merely operates to disconnect the excess lines from TASI transmitter 13.

The transmitting primary and excess line switching relays preferably have holding circuits which maintain them in the switch-out position even after the switch-out signal on bus 136 is removed. A positive switch-in signal on switch-in bus 137 is then required to disable the holding circuits and thus permit these relays to return to their normal position.

In Fig. 4 the signal on switch-out bus 136 is utilized to perform the corresponding primary and excess line switching operations at the receiving terminal, also discussed in detail with reference to Fig. 1. Thus switch-out bus 136 is connected to receiving primary line switch 25 and simultaneously to receiving excess line switch 33 and message recorder 36. At receiving primary line switch 25 it operates to disconnect the primary lines from TASI receiver 14 and connect them directly to demodulator 12. At receiving excess line switch 33, the signal on switch-out bus 136 operates to disconnect the excess lines from TASI receiver 14 and to connect them to message recorder 36. The primary and excess line switching relays may also be equipped with holding circuits which are disabled by a signal on switch-in bus 137.

The purpose of the recorded message on recorder 36 is to apprise the listeners connected to the excess lines that service has been interrupted and that alternate connections will be made as soon as possible. Without such a provision, these listeners would believe that their connections have been inadvertently cut off and would signal the operator for help. Since a large number of them might do so at once, confusion and slow service would result. A carefully formulated recorded message acquainting them with a set procedure to follow is therefore delivered to them to diminish the confusion and speed up service.

Returning to the control circuitry of Fig. 3, it can be seen that a signal on lead 150 indicating a failure and calling for switch-out causes a switch-out signal to be recurrently transmitted over the signaling channel. When this switch-out signal is received by the remote terminal, a verification signal having the same form as the switch-out signal is recurrently transmitted back to the local station. Assuming once more that the circuits of Fig. 3 comprise the local control circuitry, a description of the operation of the system will be continued.

Upon receipt of the verification signal from the remote terminal by signaling receiver 126 in Fig. 4 of the drawings, an output on lead 127 serves to set bistable device 128 and produce an output on lead 129. This output, as at the remote terminal, is introduced into AND gate 130, AND gate 131 and delay circuit 132. Since this terminal initiated the switch-out operation, however, there is no output on lead 133 to complete the enablement of AND gate 130. On the contrary, an output exists on lead 105 which output is coupled into AND gate 131. The enablement of AND gate 131 being then completed, an output is produced which is applied simultaneously to OR gate 138 and OR gate 134. The output of OR gate 134, after being amplified in amplifier 135 is applied to the switch-out bus 136 at the local terminal to perform all of the switching operations described with reference to the remote terminal. That is, both the transmitting and receiving primary and excess line switches are operated to remove the TASI equipment from service, connect the primary lines directly to the transmission facilities and connect a recorded message to the local listeners on the excess lines.

The output of AND gate 131 enables OR gate 138 to apply a signal to OR gate 124 in timing and repeater circuit 102. The output of OR gate 124 resets bistable device 114 and continues to inhibit the timing of the signal so long as AND gate 131 maintains an output.

The transmission of switch-out signals is thereby disabled once a verification switch-out signal is received.

From the above description, it is apparent that the switching system of the present invention contemplates the use of coded switching signals transmitted back and forth between a local and a remote terminal. The switch-out signal, which can be originated at either terminal, is transmitted to the remote terminal. Immediately upon receipt of a switch-out signal, the remote terminal transmits back a verification switch-out signal indicating that the original switch-out signal has been received and recognized. The remote terminal then waits until the verification switch-out signal should have been received by the local terminal and performs the switch-out operation. The local terminal performs the switch-out operation immediately upon reception of the verification signal. Because the period for which the remote terminal waits, as determined by delay circuit 132, is exactly equal to the propagation time of the transmission facility, the local and remote switch-out operations are carried out simultaneously.

Returning to Fig. 3, means will now be described which anticipate the eventuality that the switch-out or verification signals will not be received even after a reasonable number of trys. To this end, the output of amplifier 109, used to seize the signaling channel 111, is also utilized to operate a slow-to-operate relay 139. The operate time of relay 129 is chosen such that timing and repeater circuit 102 has an opportunity to repeat the switch-out signal several times, for example, five times. After this interval, in the example one-half second, armature 140 on relay 139 closes on contact 141 and connects battery 142 to lead 143. The battery voltage on lead 143 serves to enable OR gate 138 and apply a signal to OR gate 124. When thus enabled, OR gate 124 produces an output which resets bistable device 114 and maintains bistable device 114 in this condition as long as relay 139 remains operated. The signal on lead 143 thus serves to inhibit any further repetition of the switch-out signal after five trys.

The output on lead 143 is also applied to one input of three-input AND gate 144. Another input to AND gate 144 is obtained from lead 105, indicating that a switch-out operation has been locally initiated. The third input to AND gate 144 is derived from lead 145, carrying the reset output of bistable device 128. A signal on lead 145 indicates that switch-out signal has not been received to set bistable device 128. When AND gate 144 is fully enabled, it produces an output which is applied to amplifier 146. The output of amplifier 146 may be used to operate any suitable audible or visual alarm. The operation of such an alarm indicates to attendant personnel that a switch-out operation has been locally initiated and has not been completed due to some failure in the switch-out signaling. The output of amplifier 146 is used to automatically effect local switch-out or, if it is preferred, the attendant personnel may manually connect a battery to switch-out bus 136 to effect the local switch-out. Remote switch-out must then be accomplished separately as soon as the attendant personnel at the remote terminal can be made aware of the failure.

The switch-in operation is carried out in almost an identical manner as the switch-out operation. A switch-in signal manually or automatically applied to lead 150′ serves to set bistable device 104′ and produce an output on lead 105′. The output on lead 105′ is applied to OR gate 108 to initiate the timing operation in timing and repeater circuit 102 and to partially enable AND gate 107′. AND gate 107′ is completely enabled by the output of timing and repeater circuit 102 on lead 115 for ten out of every hundred milliseconds and thus energizes lead 116′ for the corresponding periods. Lead 116′, however, controls signaling transmitter 117 so as to transmit a coded switch-in signal rather than a switch-out signal. Signaling channel 111 has been seized by the operation of relay 110 in the same manner as for switch-out.

At the remote terminal, the switch-in signal is received by signaling receiver 126 and produces an output on lead 127′ to set bistable device 128′. The output of bistable device 128′, which appears on lead 129′, is applied to AND gate 130′, and gate 131′ and delay circuit 132′. Delay circuit 132′ also provides a delay time equal to the propagation time of the transmission facility and serves to place a signal on switch-in bus 137 by way of OR gate 134′ and amplifier 135′. As mentioned earlier, the signal on switch-in bus 137 serves to disable the holding circuits in the primary and excess line switches of the remote terminal and return the TASI facilities to service.

The output on lead 129′ also serves to complete the enablement of AND gate 130′ and, by way of OR gates 106′, 107′ and 108, to initiate the transmission of verification switch-in signals. In performing this function, timing and repeater circuit 102 operates in the same manner as in the switch-out operation.

Upon receipt of the verification switch-in signal by signaling receiver 126 at the local terminal, bistable device 128′ is set by way of lead 127′ and produces an output on lead 129′. This output on lead 129′ completes the enablement of AND gate 131′ and produces a signal on switch-in bus 137 by way of OR gate 134′ and amplifier 135′. Again, if all signals are transmitted and received, the two terminals will switch-in simultaneasly to provide uninterrupted service on the primary lines.

It will be noted that an alarm has not been provided to indicate that the switch-in operation which has been initiated has not been successfully completed. While such an arrangement could easily be provided, the arrangements of the present invention contemplate that personnel will already be in immediate attendance and will not have to be told by an alarm of a failure. A switch-in lamp 147 is provided, however, to tell them when the switch-in operation is completed. Lamp 147 is connected to switch-in bus 137 and will light when this bus is energized by a successful completion of a complete round trip by the switch-in signals.

It will be noted that leads 148 and 148′ have been provided to reset switch-out and switch-in logic circuits 101 and 100, respectively. A signal applied to either of these leads resets the associated bistable device (104 or 104′) and prepares these circuits for a future switching operation. A signal on reset lead 148 also resets bistable device 128 and 128′ to prepare these devices for future switching operations.

A switching system has been described for simultaneously switching local and remote terminals to remove specific equipment from service. While the switching system of the present invention has been described with reference to time assignment speech interpolation facilities, it is to be understood that these arrangements are only illustrative of numerous and varied other arrangements which could represent applications of the principles of the invention. Such other arrangements may readily be devised by those skilled in the art without departing from either the spirit or the scope of the invention.

What is claimed is:

1. In a time assignment speech interpolation communication system including common control means for utilizing a first plurality of transmission channels to interconnect a second greater plurality of signal sources with a corresponding second plurality of remote utilization means, switching control means for connecting said common control means in said communication system, which switching control means comprises means for transmitting a switching signal from a first terminal of said communication system to a second terminal of said communication system, means responsive to the reception of said switching signal for transmitting a verification signal from said second terminal to said first terminal, means at said first terminal, responsive to the reception of said verification signal, for connecting said transmission channels directly to selected ones of said signal sources, means at said second terminal responsive, after a delay equal to the propagation time of said transmission channels, to the reception of said switching signal for simultaneously connecting said transmission channels to those ones of said utilization means corresponding to said selected signal sources.

2. The combination according to claim 1 further including means at said second terminal responsive to the reception of said switching signal for connecting a recorded message source to the remainder of said utilization means.

3. The combination according to claim 1 further including means for repeating the transmission of said switching signal from said first terminal to said second terminal at regular intervals, and means for disabling said repeating means in response to the reception of said verification signal.

4. The combination according to claim 3 further including means for operating said disabling means after a fixed interval of time regardless of the reception of said verification signal, and means responsive to said operating means for generating an alarm signal.

5. In a transmission system having two geographically separated terminal stations, and a plurality of transmission lines extending between said terminal stations, means for simultaneously switching said transmission lines at both of said terminal stations, which switching means comprises means for transmitting a switching signal from one of said terminal stations to the other of said terminal stations, means for detecting said switching signal at said other terminal station, means responsive to the detection of said switching signal for immediately transmitting a verification signal from said other terminal station to said one terminal station, means also responsive to the detection of said switching signal for switching said transmission lines at said other terminal station after a substantial delay, means for detecting said verification signal at said one terminal station, and means responsive to the detection of said verification signal for simultaneously switching said transmission channels at said one terminal station.

6. In a two-way transmission system including terminal stations and a plurality of signal transmission lines for each direction of transmission extending between said terminal stations, means for initiating a supervisory operation at one of said terminal stations, means for transmitting a supervisory signal indicative of said operation over one of said signal transmission lines to the other of said terminal stations, means responsive to the reception of said supervisory signal for transmitting a verification signal to said one terminal station, means also responsive to the reception of said supervisory signal but after a delay equal to the propagation time of said transmission system for performing said supervisory operation at said other terminal station, and means responsive to the reception of said verification signal for simultaneously performing said supervisory operation at said one terminal station.

7. In a communication system utilizing time assignment facilities for connecting individual ones of a plurality of signal sources to individual ones of a lesser plurality of transmission lines only when the individual signal source is active and the individual transmission line is idle, and for connecting said transmission lines to utilization means corresponding to said signal sources, means for utilizing said transmission lines during failure of said time assignment facilities which comprises means responsive to the failure of said time assignment facilities for transmitting a switch-out signal in one direction along one of said transmission lines, means for transmitting a verification signal in the other direction along said one transmission line, means responsive to said switch-out and verification signals for simultaneously connecting said transmission lines to selected ones of said signal sources equal in number to said lesser plurality and simultaneously to the corresponding ones of said utilization means.

References Cited in the file of this patent

UNITED STATES PATENTS

| | | |
|---|---|---|
| 2,680,162 | Brehm et al. | June 1, 1954 |
| 2,802,199 | Albrighton et al. | Aug. 6, 1957 |